Patented Nov. 20, 1951

2,576,081

UNITED STATES PATENT OFFICE 2,576,081

PLANT GROWTH REGULATION

Nathaniel Tischler, Palmyra, N. J., and Ernest P. Bell, Detroit, Mich., assignors to Sharples Chemicals Inc., a corporation of Delaware No Drawing. Application December 6, 1949, Serial No. 131,501

19 Claims. (Cl. 71—2.5)

The present invention relates to an improved method and compositions for treating growing plants whereby the normal life cycle of a plant is altered with advantageous results. More particularly it relates to a process and compositions for treating growing plants with 3,6-endoxohexahydro-orthophthalic acid.

This acid is capable of existing in three separate and distinct geometrically isomeric forms, namely, the exo-cis isomer, the endo-cis isomer, and the trans isomer, as defined by Woodward and Baer, Journal of the American Chemical Society, 70, 1161–1166. Of these three isomers the exo-cis isomer is preferred in view of its generally greater activity. Furthermore, the exo-cis isomer can be prepared more economically and conveniently.

The acid employed in this invention is unusually versatile, first, with respect to the types of plant response which it is capable of inducing, second, with respect to the types of plants upon which it exerts useful effects, and third, with respect to the forms in which it may be used, the latter including, for example, anhydrides and water-soluble salts.

For example, this acid may bring about such effects as leaf abscission (partial or complete), blossom thinning, vine-kill, total destruction of the plant, adventitious root formation, or delay of fruit drop, the particular plant response manifested depending to a large extent upon the applied concentration of the response agent, and the species and degree of maturity of the plant undergoing treatment. The term plant as used herein is understood to include all portions of the plant, such as the roots, stems, leaves, blossoms, seeds, and fruits.

While under suitable conditions any of the foregoing effects may be induced, depending upon the conditions of treatment, the treatment is particularly outstanding in the accelerated induction of plant physiological effects such as defoliation, or such as selective or non-selective killing of plants, and for convenience will be described more particularly with reference thereto. Induced defoliation is the hastened abscission of foliage, brought about by causing certain accelerated physiological effects in certain plants which usually defoliate normally at some stage of their life cycle, such as, at the onset of the winter season; whereas plant kill is a drastic phytotoxic effect of importance in the extermination of dicotyledonous weeds (usually broadleafed plant species) and of monocotyledonous weeds (including various species of grasses), etc.

It is well known that the presence of excessive foliage at the time of harvesting is undesirable in the case of many crops among which may be mentioned cotton, potatoes, tomatoes, and beans such as soy beans and lima beans. This is particularly true if the crop is to be harvested mechanically. Controlled defoliation greatly facilitates harvesting, and in many circumstances also results in marked improvement in the quality and/or ripening time of the product. Furthermore, the elimination of foliage, after it has served its primary purpose, may be effective in avoiding or minimizing certain late season blights, and/or other undesirable developments. Early defoliation of nursery stock is often desirable to permit the digging and preparation of the stock for shipment at a more convenient time.

By a defoliant is meant a substance which, upon penetrating, in suitable concentration, the epidermal layer of a growing plant which normally tends to defoliate during its life cycle (usually after maturity), brings about an accelerated abscission of the leaves without causing complete destruction of the plant. The ultimate goal in defoliation might be considered to be complete abscission of leaves coupled with negligible injury to the rest of the plant insofar as the final maturation of the crop is concerned. A measure of the value of a defoliant, generally speaking, is the extent to which this ultimate objective is attained. For practicable utility, moreover, the defoliating agent (i. e. defoliant) must be effective in relatively low concentrations.

Various substances have been suggested as defoliants among which may be mentioned pentachlorophenol, cyanamides, sulfamates, fluorides, thiocyanates, and chlorates. Insofar as the applicants are aware, however, no outstandingly satisfactory defoliant has heretofore been developed.

The present invention, on the other hand, provides an effective and economical means of defoliating plants which undergo seasonal leaf abscission in the course of their normal life cycle. It is of particular value commercially in the defoliation of cotton, Irish potatoes (i. e., the common white potatoes), sweet potatoes, soy beans, tomatoes, and other plants.

This invention also provides an economical and effective means of destroying undesirable vegetation including many species of unwanted herbs, grasses, ferns, etc. In some instances it may be desired to practice selective destruction of the unwanted species, without causing appreciable damage to desirable species growing in the same area, while in other instances it may be desired to destroy all plants growing in a given area. When the plant response agent is employed as a weed killer, it is usually desirable, though not essential, that it be applied to the weed prior to full maturity, and preferably when said weeds (i. e. objectionable plants) are fairly young. In some instances, moreover, it may be desirable to kill useful crops, such as for military purposes or to control production, and the invention may advantageously be adapted to such objectives.

To prevent germination of weed seeds and to destroy weed seedlings and plants, various practices are followed in accordance with the particular purpose desired. In some cases, it is desired to prevent the growth and/or to destroy all of the plants in a given locality, such as on tennis courts and other sports fields, in tracts about various buildings such as offices, factories, and barnyards, along fences, along power or railroad rights-of-way, highways, etc.

In other cases, such as in agricultural practices or in the maintenance of lawns, it is desired to prevent the growth and/or to cause the destruction of obnoxious weeds with little or no attendant damage to crop plants. Chemicals employed in such practices are referred to as selective weedkillers. For example, certain chemicals are said to destroy young weeds in onion fields with no or but temporary setback to the onion crop.

The chemicals which have been proposed for such selective killing of plant species are relatives few; they include thiocyanates, cyanates, chlorinated phenols, dinitrocresols, and, more recently, chlorinated phenoxy aliphatic acids, especially 2,4-dichlorophenoxyacetic acid (hereinafter referred to as 2,4-D). Those available have the disadvantage that they are either relatively ineffective against the large, broadleafed weeds or give poor control of annual grasses, unless used in such large amounts as to cause crop injury. Contrarily, the acid of this invention can be used at such rates of chemical per acre as to give a much greater margin of safety in the control of both broadleafed weeds and annual grasses without injury to certain crops, for example, onions.

In the selective prevention or destruction of undesired weed seedlings or plants, three special kinds of practices have been followed: pre-planting treatments, pre-emergence treatment, and post-emergence treatment. By pre-planting treatment is meant the application of either sprays or dusts, but more commonly sprays, to the soil previous to planting of the crop seeds or plants, usually from one to three weeks previously. By pre-emergency treatment is meant the application of either sprays or dusts, but more commonly sprays, to the soil after the seeds have been planted but before the emergence of the crop seedlings. By post-emergence treatment is meant the application of either sprays or dusts, but more commonly sprays after the plants have emerged from the soil or after transplanted plants have established themselves. Such post-emergence treatments are usually made while the weed plants are quite small, since in general less chemical is required to destroy young weed plants than fairly mature weeds.

The objective in the case of the pre-planting practice is to destroy weed seeds, weed seedlings, and more fully grown weed plants, before planting the crop seeds or plants so that the herbicidal chemical either will be leached from the soil by rainfall, or will volatilize, if it is one of sufficiently high vapor pressure, or will be decomposed, as for example by micro-organisms, in the soil, so that there will be no chance of injury by the chemical to crop plants.

The objective in the case of pre-emergence practice is to destroy young weed seedlings or plants before the crop seeds germinate or before they emerge from the soil. Thus it has been found, for example, that when small quantities of aqueous solutions of the acid of the invention (in the form of the disodium salt of the exo-cis isomer and at dosages of 3 to 4 pounds of active ingredient per acre) were sprayed onto soil in pre-emergence tests, excellent control of weeds such as chickweed and bindweed was obtained, with no or at most slight toxic effects to a variety of planted crops, including cucumbers, bucketwheat, and corn.

In the case of post-emergence practice, as a rule, selective herbicidal chemicals must be applied in lower amounts per area than when the same chemicals are applied as pre-emergence agents.

The value of an herbicidal chemical, especially where it is capable of serving as a selective one, depends on two main factors: the ability of the chemical to be absorbed into the plant where applied and, once absorbed, the ability of the chemical to be translocated to portions of the plant away from the locus of application so that it can bring about plant physiological responses at these distant plant tissues. It is generally recognized that applications of herbicides to root systems or to wounded stem surfaces bring about translocated effects of a systemic nature. Aside from plant regulatory chemicals like 2,4-D and other such stimulatory plant hormones which readily bring about translocated response, no matter where applied, the usual herbicides such as thiocyanates, cyanates, chlorinated phenols, and dinitrophenols and cresols and their salts cause localized effects only where treatments are applied.

The acid of this invention, and particularly the exo-cis isomer thereof, brings about striking translocated effects. This fact can be readily demonstrated by applying said acid, for example, in either lanolin or a high molecular weight polyethylene glycol (e. g. Carbowax 1500) pastes to lower portions of the stem, such as the hypocotyl in the case of beans, which is below the primary leaves. Such applications induce defoliation of primary leaves of young bean plants as well as cause severe inhibition of the terminal trifoliate shoot development of such species.

A special, outstanding value of this acid resides in the fact that it is much more effective in the control of most of the grassy weed species than are the currently-used herbicides, including 2,4-D, its salts and esters, and also including sodium trichloroacetate which is used mainly as a grass killer. A considerable mass of data has been obtained in which it is shown that this acid, and particularly the exo-cis isomer thereof, is many times more effective than sodium trichloroacetate in the control of many species of grasses. However, a few grasses, notably Bermuda grass, are very resistant to this acid. Bermuda grass, ordinarily considered a weed grass, is used quite widely in certain areas as a very desirable lawn grass. Therefore, the acid of the invention is contemplated as a selective weedkiller to destroy both broadleafed and grassy weeds in Bermuda grass lawns.

Another outstanding herbicidal value of this acid is that when small volumes of quite low concentrations of aqueous solutions thereof are injected into small holes bored in trunks of various species of trees, or when exposed small roots of bushes or of even quite large trees are placed in such aqueous solutions, these bushes and trees are almost invariably killed in a few days. This is evidence that absorption of the acid into the vascular system of higher plants causes unusually drastic phytotoxic effects. This applies more particularly to the exo-cis isomer.

In the case of inducing adventitious root formation or rooting response the acid of the invention has practicable application, for example, in the stimulation of root formation at the base of cuttings.

In the practice of the invention there is applied to the plant a composition which contains 3,6-endoxohexahydro-orthophthalic acid which may be in the form of the acid per se or in other form, such as in the form of the anhydride and/or a salt which contains 3,6-endoxohexahydrophthalate anion or anions of ortho configuration, the same as in the case of the acid per se, said anion or anions being either acid or neutral in character, in chemical combination with a sufficiency of cation or cations to satisfy valence requirements, such as one or more metal and/or metalloid cations such as sodium, potassium, calcium, strontium, magnesium, aluminum, iron, cobalt, nickel, zinc, cadmium, mercury, copper, ammonium, mono-, di- and trialkylammonium, mono-, di-, and trialkanolammonium, and mixed alkylalkanolammonium which is N-substituted by from 2 to 3 radicals of the type indicated.

Thus it will be seen that the acid is the active material, and that this is so whether it is used as such, or in the form of a salt, or anhydride, or other form. These changes at the carboxyl groups are mere changes in form rather than changes in substance.

A neutral salt is a salt in which both carboxyl groups of the acid are involved in salt formation, whereas an acid salt is one in which only one of the carboxyl groups of the acid is involved in salt formation. A mixed salt is a salt in which the cations are different. The acid may be used in any of these forms.

The alkylammonium salts such as monoalkylammonium, dialkylammonium, or trialkylammonium preferably have from 1 to 12 carbon atoms in each alkyl group, the totality of carbon atoms preferably being not more than 12. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

By an acid 3,6-endoxohexahydrophthalate anion of ortho configuration is meant a univalent anion having a structure defined by the formula

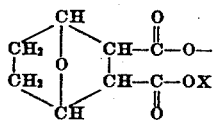

wherein X is a cation, usually considered by modern theory to be hydrogen.

By a neutral 3,6-endoxohexahydrophthalate anion of ortho configuration is meant a divalent anion having a structure defined by the formula

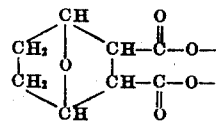

When the acid per se and/or its anhydride is used, its aqueous solution probably contains non-ionized acid and/or anhydride in equilibrium with ionized material.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, monododecylammonium and similar monoalkylammonium salts of 3,6-endoxohexahydro-orthophthalic acid.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of 3,6-endoxohexahydro-orthophthalic acid.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of 3,6-endoxohexahydro-orthophthalic acid.

Examples of monoalkanolammonium salts are the monoethanolammonium, monopropanolammonium, and similar salts of 3,6-endoxohexahydro-orthophthalic acid.

Examples of dialkanolammonium salts are the diethanolammonium, dipropanolammonium, ethanolpropanolammonium and similar salts of 3,6-endoxohexahydro-orthophthalic acid.

Examples of trialkanolammonium salts are the triethanolammonium, tripropanolammonium, ethanoldipropanolammonium, propanoldiethanolammonium and similar salts of 3,6-endoxohexahydro-orthophthalic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of 3,6-endoxohexahydro-orthophthalic acid.

Examples of dialkyl monoalkanolammonium salts are the dimethylethanolammonium, diethylethanolammonium, dipropylethanolammonium, dibutylethanolammonium, dimethylpropanolammonium diethylpropanolammonium, dipropylpropanolammonium, dibutylpropanolammonium, methylethylethanolammonium, methylethylpropanolammonium, ethylpropylethanolammonium, propylbutylethanolammonium, propylbutylpropanolammonium, and similar salts of 3,6-endoxohexahydro-orthophthalic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of 3,6-endoxohexahydro-orthophthalic acid.

As pointed out above the salts contemplated include both the acid salts and the neutral salts, and mixed neutral salts, that is salts in which the cations are different.

The preparation of the acid per se and its equivalents may be accomplished by any means known to the art, and suitable methods will suggest themselves to persons skilled in chemical synthesis upon becoming familiar therewith.

The following specific examples are illustrative of the preparaton of the acid per se, and its equivalents.

EXAMPLE 1

*3,6-endoxohexahydro-orthophthalic anhydride*

3,6-endoxohexahydro-orthophthalic acid was refluxed with acetyl chloride. The acid was thus converted to 3,6-endoxohexahydro-orthophthalic anhydride which separated as a precipitate. Said precipitate, after being freed of volatiles, was found to melt at 115° C. as compared with the literature value of 116–117° C.

EXAMPLE 2

*3,6-endoxohexahydro-orthophthalic acid monohydrate*

500 cc. of an aqueous solution containing 113.5 g. (approximately 0.5 mole) of disodium 3,6-endoxohexahydro-orthophthalate was acidified with 100 cc. of 35% hydrochloric acid (approximately 1 mole). The acidified solution was concentrated at atmospheric pressure until some solid had separated. The solution was then cooled. There was thus obtained a heavy precipitate which was filtered off.

Since this material was found to contain an appreciable amount of sodium chloride, it was twice recrystallized from water which had been acidified. The recrystallized material was air-dried for several days, and was then dried at about 35° C. in an oven. There was thus obtained a white, crystalline product which could be broken up into a free-flowing powder. This product, which was 3,6-endoxohexahydro-orthophthalic acid monohydrate, had a melting point of 105–112° C. and a neutral equivalent of 101, as compared to a theoretical neutral equivalent of 102.

EXAMPLE 3

*Metal salts of 3,6-endoxohexahydro-orthophthalic acid*

15% aqueous solution of 3,6-endoxohexahydro-orthophthalic acid was completely neutralized with the calculated quantity of aqueous sodium hydroxide, thus providing an aqueous solution of the disodium salt. An aliquot portion of this solution, containing 1 mole of the disodium salt was rendered slightly acidic by the addition of a few drops of hydrochloric acid. There was then introduced with stirring a concentrated aqueous solution containing 1 mole of cupric chloride. The desired copper salt was relatively, though not completely, insoluble and slowly precipitated from solution. The separated salt, after being washed and dried, was obtained in 50% yield and contained 28.5% copper by analysis, as compared with 25.9 theoretical, indicating some occlusion.

Treatment of a second portion of the solution of sodium salt with an equivalent quantity of zinc chloride resulted in the precipitation of the desired zinc salt which, after purification, had a zinc content corresponding closely to the zinc content of the compound, zinc 3,6-endozohexahydro-orthophthalate.

EXAMPLE 4

*Calcium 3,6-endoxohexahydro-orthophthalate*

A solution of calcium chloride (30 g., 0.27 mole) in water (150 g.) was added at room temperature to a solution of disodium 3,6-endoxohexahydro-orthophthalate (46 g., 0.20 mole) in water (154 g.) after first acidifying the latter solution with hydrochloric acid. The calcium salt precipitated immediately. Filtration and drying resulted in 77 g. of a hydrate of calcium 3,6-endoxohexahydro-orthophthalate.

EXAMPLE 5

*Magnesium 3,6-endoxohexahydro-orthophthalate*

A solution of magnesium nitrate hexahydrate (50 g., 0.21 mole) in water (150 g.) was added at room temperature to a solution of disodium 3,6-endoxohexahydro-orthophthalate (46 g., 0.20 mole) in water (154 g.) after first adding a sufficient quantity of hydrochloric acid to the latter solution to render it acidic. The resulting homogeneous solution was allowed to stand at room temperature for about one hour, whereupon large white crystals of the magnesium salt began to form. Rapid precipitation was then effected by agitation of the mixture. The mixture was filtered, and the magnesium 3,6-endoxohexahydro-orthophthalate thus obtained weighed 47 g. after it was dried.

EXAMPLE 6

*Ferric 3,6-endoxohexahydro-orthophthalate*

A solution of ferric chloride hexahydrate (43 g., 0.16 mole) in water (200 g.) was added at room temperature to a solution of disodium 3,6-endoxohexahydro-orthophthalate (46 g., 0.20 mole) in water (154 g.) after first acidifying the latter solution with hydrochloric acid to a pH of 2. The resulting orange precipitate was filtered and dried to give 53 g. of ferric 3,6-endoxohexahydro-orthophthalate.

EXAMPLE 7

*Aluminum 3,6-endoxohexahydro-orthophthalate*

212 g. of a 23% aqueous solution of disodium 3,6-endoxohexahydro-orthophthalate was rendered acidic by addition of a few drops of dilute hydrochloric acid. The solution contained 48.7 g. (0.212 mole) of disodium 3,6-endoxohexahydro-orthophthalate. To this solution was added, with stirring, a solution prepared by dissolving 44 g. (0.067 mole) of aluminum sulfate octadecahydrate in 25 cc. of water. A slurry formed and was filtered. There was thus obtained a pasty material, which was washed by resuspending it in 150 cc. of water. This suspension was filtered, and the residue thereby obtained was dried at 70° C. to give 14.5 g. of a pale yellow, crystalline solid. The aluminum content of this product was found to be 9.2%, compared to a calculated value of 8.9% for aluminum 3,6-endoxohexahydro-orthophthalate. The solubility of the product in water was found to be 1.65 g. per 100 g. of water at 23° C.

EXAMPLE 8

*Diammonium 3,6-endoxohexahydro-orthophthalate*

3,6-endoxohexahydro-orthophthalic acid (46 g.) was dissolved in methanol (300 cc.). This solution was maintained between 10° C. and 20° C. while gaseous ammonia was bubbled into it. This procedure resulted in the formation of a solid precipitate, and passage of ammonia through the solution was continued until precipitation was complete. The precipitate consisted of white, powdery diammonium 3,6-endoxohexahydro-orthophthalate which was filtered off and air-dried.

EXAMPLE 9

*Sodium acid 3,6-endoxohexahydro-orthophthalate*

Dissolve 93 g. (0.5 mole) of 3,6-endoxohexahydro-orthophthalic acid in 500 cc. of water. To this solution slowly add, with stirring, a solution of 20 g. (0.5 mole) of sodium hydroxide in 100 cc. of water. Carry out this neutralization at a temperature between 20° C. and 30° C. Remove the water by vacuum evaporation, the temperature being maintained between about 40° C. and 50° C., to obtain white, powdery sodium acid 3,-6-endoxohexahydro-orthophthalate.

EXAMPLE 10

*Sodium ammonium 3,6-endoxohexahydro-orthophthalate*

Prepare a solution which contains 186 g. (1 mole) of 3,6 - endoxohexahydro-orthophthalic acid dissolved in 1 liter of water. Prepare another solution which contains 40 g. (1 mole) of sodium hydroxide, 17 g. (1 mole) of ammonia, and 200 cc. of water. Stir the acidic solution and add the basic solution thereto, carrying out this neutralization between 20° C. and 30° C. Remove water under vacuum at a temperature of about 40° C. to obtain solid sodium ammonium 3,6-endoxohexahydro-orthophthalate.

EXAMPLE 11

*Alkylammonium salts of 3,6-endoxohexahydro-orthophthalic acid*

3,6-endoxohexahydro-orthophthalic acid (0.02 mole) was dissolved in 75 cc. of hot acetone. To this solution was added dibutylamine (0.046 mole). This quantity of the amine was slightly in excess of that required for complete neutralization of the acid. Appearance of a precipitate occurred after a few minutes. After about one-half hour, the solid was filtered off and was then air-dried. This product, which was bis(dibutylammonium) 3,6-endoxohexahydro-orthophthalate, was a free-flowing crystalline solid which melted at 126–127° C.

By the same procedure, salts were prepared from 3,6-endoxohexahydro-orthophthalic acid and the following amines: diethylamine, tributylamine, and monohexylamine.

The following table gives physical properties of the salts thus prepared.

TABLE 1

| 3,6-Endoxohexahydro-orthophthalate | Physical Appearance | Melting point, °C. |
|---|---|---|
| Bis(diethylammonium) | White powder | 128–134. |
| Bis(dibutylammonium) | White, free-flowing powder | 126–127. |
| Bis(tributylammonium) | Straw-colored, viscous liquid | |
| Bis(monohexylammonium) | White solid | 142 decomp. |
| Bis(monooctylammonium) | ...do... | 128.6–131. |
| Bis(dioctylammonium) | White, free-flowing powder | 119.5–121. |
| Bis(monododecylammonium) | White solid | 113–125. |

The first four of the above salts of Table 1 are soluble in water to an extent greater than 20%. Alkylammonium salts which are N-substituted by one or more alkyl radicals having from 1 to 6 carbon atoms per radical are characterized by appreciable water solubility. The remaining salts of the above table have a considerably lower solubility in water, but are nevertheless not insoluble.

EXAMPLE 12

*Bis(tributylammonium) 3,6 - endoxohexahydro-orthophthalate*

Tributylamine (37.0 g., 0.2 mole) was added slowly to a vigorously stirred solution of 3,6-endoxohexahydro - orthophthalic acid monohydrate (20.6 g., 0.1 mole) in water (136 g.). Neutralization occurred with the evolution of heat. The resulting aqueous solution contained 28.6% of bis(tributylammonium) 3,6-endoxohexahydro-orthophthalate.

EXAMPLE 13

*Diethylammonium acid 3,6-endoxohexahydro-orthophthalate*

By the procedure of Example 12, mix diethylamine (7.3 g., 0.1 mole) with 3,6-endoxohexahydro-orthophthalic acid monohydrate (20.6 g., 0.1 mole) in water (136 g.) to produce an aqueous solution of diethylammonium acid 3,6-endoxohexahydro-orthophthalate.

EXAMPLE 14

*Diethylammonium propylammonium 3,6-endoxohexahydro-orthophthalate*

By the procedure of Example 12, combine a mixture consisting of diethylamine (7.3 g., 0.1 mole) and propylamine (5.9 g., 0.1 mole) with 3,6-endoxohexahydro-orthophthalic acid monohydrate (20.6 g., 0.1 mole) in water (200 cc.) to produce an aqueous solution of diethylammonium propylammonium 3,6 - endoxohexahydro - orthophthalate.

EXAMPLE 15

*Alkanolammonium and alkylalkanolammonium 3,6-endoxohexahydro-orthophthalates*

Dissolve 3,6-endoxohexahydro - orthophthalic acid (0.1 mole) in 200 cc. of water. To this solution slowly add, with vigorous stirring, an amount of diethanolamine sufficient to neutralize both carboxyl groups. Then remove water under vacuum at a temperature below 40° C., to yield a residue of bis(diethanolammonium) 3,6-endoxohexahydro-orthophthalate.

Follow the same procedure to prepare the corresponding salts of other alkanol amines, such as, monoethanolamine, triethanolamine, ethylaminoethanol, and diethylaminoethanol.

EXAMPLE 16

*Sodium triethylammonium 3,6-endoxohexahydro-orthophthalate*

3,6-endoxohexahydro-orthophthalic anhydride (1.7 g., 0.01 mole) was dissolved in water (20 cc.) to furnish a solution of the corresponding dicarboxylic acid. Triethylamine (1.0 g., 0.01 mole) and a solution of sodium hydroxide (0.4 g., 0.01 mole) in water (4 cc.) were added to the solution of the acid. There was thus obtained a colorless solution of sodium triethylammonium 3,6-endoxohexahydro-orthophthalate, which was evaporated at room temperature to yield the dry salt in the form of a white, flaky solid.

While the above examples pertain more particularly to the preparation of the exo-cis isomer, any of the procedures known in the art may be employed to prepare the exo-cis isomer, the endo-cis isomer or the trans isomer.

For example, the exo-cis isomer of 3,6-endoxo-1,2,3,6-tetrahydro-orthophthalic anhydride may be readily hydrogenated to exo-cis-3,6-endoxohexahydro-orthophthalic anhydride by methods which are recorded in the literature. The latter compound obtained from such hydrogenation may, if desired, be dissolved in water to provide an aqueous solution of exo-cis-3,6-endoxohexahydro-orthophthalic acid. The acid may be obtained as a solid by evaporating this aqueous solution under reduced pressure. Exo-cis-3,6-endoxo-1,2,3,6-tetrahydro-orthophthalic anhydride may be prepared by any means known in the art, such as, by the condensation of furan with maleic anhydride using the Diels-Alder reaction.

Although the applicants do not wish to be bound by any particular theory as to the mechanism whereby the above-described useful plant response effects are produced, a considerable amount of experimentation has strongly indicated that said effects are brought about by the existence in aqueous media of 3,6-endoxohexahydro-orthophthalate anion or anions (acid and/or neutral). Both neutral anion and acid anion are effective. A salient feature of this theory is that the acid of the invention, when applied as the acid per se, or in other form, to a living plant, makes 3,6-endoxohexahydro-orthophthalate anion or anions (acid and/or neutral) available to the plant, at or near the site of application, and through translocation phenomena, at points far removed from the site of application.

The desired anion or anions are made available by virtue of the fact that the acid per se, and its other forms, are water-soluble and ionizable. Therefore, when such a compound is absorbed into the vascular system of a plant, it dissolves in the aqueous plant juices and provides the functioning anion or anions. The resulting physiological activity is believed to be ascribable to the presence of anion or anions, whether or not assisted by the presence of any particular cation or cations. The acid per se and its other forms may thus be regarded as very convenient media for furnishing the desired anion or anions to susceptible portions of the plant.

It follows, therefore, that the acid per se and its other forms are equally usable.

In actual practice it has been found that in certain applications in certain regions, such as arid regions, some forms of the acid are absorbed by the plane surfaces more efficiently than other forms. In humid regions, plants, such as cotton for instance, absorb the active ingredient more readily than in arid regions. In the latter regions it is better to apply the acid in the form of a water solution of a salt which does not tend to crystallize on leaf surfaces, such as the bis(triethylammonium) salt, and/or in admixture with an adjuvant, such as a wetting agent and/or humectant. However, it is to be understood that the active ingredient, irrespective of its physical form (e. g. in solution or as a dust), may be applied in some other way to assure its absorption by the plant, such as over or in a wounded surface, or by injection, or by direct application to the roots of the plant. Hence it may at times be a matter of choice and judgment as to the very best means of application of the particular compound in the particular region and for the particular purpose under consideration.

The acid per se has an appreciable solubility in water. The other forms are also soluble in water. Some of them are highly soluble. Others have a lesser degree of solubility. However, it is preferred to employ compounds having a solubility in water to the extent of at least 0.1% by weight, and still more particularly of at least 1% by weight.

From the foregoing it will be appreciated that for plant response purposes very low concentrations in applied aqueous solutions are effective. For example, in the defoliation of young bean plants a concentration of .05% by weight in applied aqueous solution of the compound employed, such as the disodium salt of the exo-cis isomer has been found to be effective.

The compounds are applied to the crop or plants in any desired manner, such as, in the form of a solid, for example by dusting, or in the form of a liquid, for example by spraying. They may also be employed by injection, such as into the stem of the plant, or at a point at which the epidermal layer is broken or wounded, or to the roots of the plant, or otherwise.

Compositions may be formulated by admixing the active ingredient with any desired liquid or solid carriers such as any of the finely divided solid carriers known in the dusting art, which are preferably of large surface area, such as a clay, for example, fuller's earth, propyhllite, talc, bentonite, kieselguhr, diatomaceous earth, etc. Any of the commercial clays available on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soy bean, potato, cotton seed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more particularly through a 200 mesh sieve. Excellent results have been obtained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable, or synthetic origin, such as kerosene, fuel oil, lubricating oil, soy bean oil, linseed oil, castor oil, sperm oil, cod liver oil, etc. For defoliation or rooting response application, oils are usually selected which in themselves are relatively harmless to the plant.

Aqueous solutions or dispersions are economical and desirable. In general, the choice of the particular liquid carrier employed may be guided somewhat by prevailing circumstances, such as its availability, its solubility or dispersion characteristics toward the particular active agent employed, and/or its toxicity toward the plants undergoing treatment. In general, water is an excellent liquid carrier.

Thus spray formulations comprising the active ingredient in the form of a solution, suspension, or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and nonionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be undertaken merely by agitating said mixture with the carrier, particularly when aqueous. The plant response agent, if not soluble in the carrier in the concentration desired, may be dispersed as such, or may be dissolved in a solvent, and emulsified by agitation with the carrier. This applies particularly when both water and oil are employed as the carrier.

The concentration of surface active agent in the final emulsion or dispersion should be sufficient to make the phases readily dispersible, and in general for this purpose from 0.02% to 2% is satisfactory. Any desired additional amount may be added such as for adjuvant purposes, as will be understood. Thus, if the surface active agent is to be premixed with the plant response agent, the selected relative proportions of the two will largely depend upon the purposes in mind. For mere purposes of forming spray emulsions or dispersions, mixtures containing a surface active agent to the extent of from about 1% to about 25% by weight of plant response agent are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the plant.

The use, if desired, of adjuvants, such as wetting agents and/or humectants, is also contemplated in connection with solutions of the active ingredient, such as water solutions. Any suitable wetting agent and/or humectant may be employed for this purpose, such as the wetting agents more particularly referred to herein. Examples of humectants are glycerine, diethylene glycol, ethylene glycol, polyethylene glycols generally, mixtures of glucose and fructose, and corn syrup.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying upon the plant. It has been shown, for instance, that the amount of active ingredient necessary to produce good cotton defoliation may be reduced to as low as ½ pound per acre if employed with a rate of wetting agent as high as 1 pound per acre.

It should be considered that once the solution has been sprayed upon the plant, the concentration of wetting agent existing upon the leaf is in no sense a function of the concentration existing in the original spray solution. Thus, evaporation might concentrate the wetting agent considerably, or the presence of a dew on the leaf surface, or of plant juices on the leaf surface might considerably dilute this agent. Spray rates normally run from 1 to 20 gallons per acre. Dews may vary from possibly 10 to 2000 gallons per acre.

Wetting agents appear to serve the multiple purposes of aiding in the penetration of the leaf surface by the active ingredient, spreading of the active ingredient over the leaf area, and retarding or preventing crystallization in the case of those forms of the active ingredient which show a tendency to crystallize when the spray dries.

Although the active ingredient may be applied to the growing plant in concentrated form, it is usually desirable to employ liquid or solid formulations, for example as discussed above in which the active ingredient constitutes less than 30% by weight of the total, such as less than 10% and even as low as 0.1%.

Other substances than the carrier and/or surface active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as fungicides, insecticides, bactericides, or types of plant response agents other than those agents discussed herein. The preparation of such additions and the materials added do not require elaboration, but will suggest themselves to persons skilled in the art upon becoming familiar herewith.

In practice of the process as applied to defoliation, the rate of application (i. e. the amount of active ingredient per crop unit) for best results will depend among other factors upon the species of plants being treated and upon their maturity.

The active ingredient of this invention, for example, in the form of the disodium salt of the exo-cis isomer, is frequently effective in the defoliation such as of sweet potatoes when applied at the rate of only 0.1 pound per acre, and only under unusual circumstances is it necessary to apply more than 10 pounds per acre to obtain the desired results. Soy beans usually require somewhat higher rates of application, but generally from 1 to 10 pounds per acre is sufficient, depending upon whether adjuvant is employed.

As a rule the more mature the plant at the time of application, the less active material is required. In practice the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Effective rates of application, for defoliation purposes, may sometimes be as low as 0.1 pound per acre when defoliating a susceptible plant at near maturity. Use of dosages greatly in excess of the minimum required for good defoliation may result in shock to the plant with attendant injury to the remainder of the plant.

In fact the plant response agent of the present invention is an effective herbicide when used in amounts substantially greater than those required for defoliation, and it may be used advantageously for the killing of plants or vines (as in the case of potatoes) when desired, such as, for the killing of undesired plants, for example weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents.

Application of the active ingredient of the present invention to the stems of plant cuttings promotes the growth of roots at or near the zone of application. By such treatment of cuttings prior to planting, mortality is substantially reduced. A convenient and effective procedure is to mix the active ingredient with a viscous liquid or paste, such as lanolin or a high molecular weight ethylene oxide condensation product, i. e. a polyglycol ether. Any other viscous or pasty substance capable of adhering to the stem of the cutting may be employed for this purpose providing, of course, that it is not injurious to the stem. The amount of active agent necessary to induce rooting response is small and normally from .1 to 10 milligrams of active ingredient per cutting is sufficient. Use of excessive quantities is undesirable.

The following examples illustrate the invention (generally and without limitation to the specific form of the active ingredient employed) as applied to the treatment of various plants to produce various plant responses including defoliation, herbicidal action, and rooting response, the specific isomer being the exo-cis.

EXAMPLE 17

A few roots of blackberry bushes, 4 to 6 feet high, were exposed by spading. The terminal portion of a wounded root of each bush was placed in a small bottle containing 10 cc. of a 0.1% aqueous solution of disodium 3,6-endoxohexahydro-orthophthalate. It was noted that within two days, each bush had absorbed the 10 cc. of solution and had died.

EXAMPLE 18

Some roots of a wild cherry bush 8 feet high were exposed by spading. The terminal portion of a wounded root was placed in a bottle containing 200 cc. of a 0.5% aqueous solution of disodium 3,6-endoxohexahydro-orthophthalate. The bush absorbed the solution, and in three weeks it was observed that the bush was dead.

EXAMPLE 19

A one-half percent aqueous solution of 3,6-endoxohexahydro-orthophthalic acid was used to spray potted plants, at dosages calculated to be from 0.38 to 18 pounds per acre. Pots containing relatively mature rye plants evidenced considerable burning of the leaves at dosages below two to four pounds per acre. At dosages above this range kill of the plants was obtained. Corn, another example of a monocotyledon, behaves in a similar manner. The corn plants used were approximately two weeks old. Young shoots of alfalfa were slightly more sensitive.

Substantially identical results were obtained when the disodium salt of the above acid was employed under the same test conditions.

EXAMPLE 20

Aqueous solutions of various concentrations of disodium 3,6-endoxohexahydro-orthophthalate were prepared. Various plant species were sprayed with these solutions, making sure that the plants were thoroughly wetted by the sprays. The results of the experiments are summarized in the following table.

TABLE 2

| Plant species | Concentration of solution | Days after treatment | Plant injury |
|---|---|---|---|
| | Per cent | | |
| Plantain (broad-leaved) | 1 | 8 | Very severe. |
| Plantain (narrow-leaved) | 1 | 8 | Do. |
| Dock | 1 | 3 and 8 | Do. |
| Henbit | 2 | 3 | Do. |
| Dandelion | 4 | 3 and 8 | Severe. |
| Chickweed | 1 | 8 | Very severe. |
| White clover | 1 | 8 | Do. |
| Shepherd's purse | 2 | 3 and 8 | Moderate. |
| Bluegrass | 2–10 | 8 | Very severe. |

EXAMPLE 21

The degree of inhibition of development of the primary roots and shoots, respectively, of germinating cucumbers by 3,6-endoxohexahydro-orthophthalic acid as compared with other herbicides was determined by pipetting 15 cc. of each of several concentrations of aqueous solutions of the chemicals into individual 150 mm. petri dishes in each of which 25 seeds were placed. Four replicate tests were used for each concentration. The average length in mm. of the roots and of the shoots after incubation for 6 days are tabulated below. The germination in each dish ranged from approximately 90% to 100%.

TABLE 3

| Material | 1 P. P. M. | | 10 P. P. M. | | 100 P. P. M. | | 1000 P. P. M. | |
|---|---|---|---|---|---|---|---|---|
| | roots | shoots | roots | shoots | roots | shoots | roots | shoots |
| Controls (water alone) | 65 | 65 | 65 | 65 | 65 | 65 | 65 | 65 |
| Above acid | 60 | 60 | 12 | 30 | 7 | 7 | 2 | 0 |
| NH₄SCN | C | C | C | C | C | 25 | 22 | 7 |
| KOCN | C | C | C | C | C | C | 27 | 27 |
| NaClO₃ | C | C | C | C | C | C | C | C |
| Na pentachlorophenate | C | C | 42 | 40 | 2 | 2 | 2 | 2 |

C—In each case so designated, the length of the primary roots and of the shoots was evaluated by inspection to be substantially the same as the controls.

EXAMPLE 22

The degree of inhibition of growth of germinating rice seedlings caused by 3,6-endoxohexahydro-orthophthalic acid was determined by pipetting 15 cc. of various aqueous concentrations of the compound into 150 mm. petri dishes in each of which 25 seeds were placed. Tests were run in duplicate, and the seeds were incubated for seven days. In columns A below, the average percentages of germination at each concentration of the acid have been directly compared with the average percentage of germination in water alone, which is 82%. In columns B below, the total weight of the seedlings at each concentration of the acid has been directly compared with the total weight of the control seedlings, and the ratio has been expressed in percentage, assigning a value of 100% to the controls.

TABLE 4

| Material | 1 P. P. M. | | 10 P. P. M. | | 100 P. P. M. | | 1000 P.P.M. | |
|---|---|---|---|---|---|---|---|---|
| | A | B | A | B | A | B | A | B |
| | Per Cent | Per Cent | Per Cent | Per Cent | Per Cent | Per Cent | Per Cent | Per Cent |
| Controls | 82 | 100 | 82 | 100 | 82 | 100 | 82 | 100 |
| Above acid | 80 | 91 | 82 | 86 | 39 | 46 | 15 | 0 |

EXAMPLE 23

The comparative degree of inhibition of growth of germinating cucumber seedlings caused by 3,6-endoxohexahydro-orthophthalic acid, its disodium salt, and its bis(triethylammonium) salt was determined by pipetting 15 cc. portions of aqueous solutions of various concentrations of these compounds into 150 mm. petri dishes in each of which 25 seeds were placed. Tests were run in duplicate, and the seeds were incubated for 8 days. The seeds in untreated controls germinated 100%. Germination of the treated seeds varied from 92% to 100%. In the following table, the total weight of the treated seedlings at each concentration of each of the experimental chemicals has been directly compared with the total weight of the untreated seedlings. The ratio in each case has been expressed in percentage, assigning a value of 100% to the controls (water alone).

TABLE 5

| Concentration | Inhibition of growth compared with controls as 100% | | |
|---|---|---|---|
| | Acid | Disodium salt | Bis(triethylammonium) salt |
| | Per cent | Per cent | Per cent |
| Controls | 100 | 100 | 100 |
| 10 P. P. M. | 73 | 69 | 76 |
| 25 P. P. M. | 77 | 70 | 74 |
| 50 P. P. M. | 59 | 68 | 65 |
| 100 P. P. M. | 57 | 58 | 64 |
| 250 P. P. M. | 46 | 46 | 54 |
| 500 P. P. M. | 37 | 40 | 40 |
| 1,000 P. P. M. | 34 | 32 | 33 |

It will be noted that the acid, its disodium salt, and its bis(triethylammonium) salt gave the same degree of inhibition of growth of cucumber seedlings.

EXAMPLE 24

Geranium cuttings were treated with 20 mg. of a 1% mixture of 3,6-endoxohexahydro-orthophthalic acid in lanolin. The lanolin mixture was spread over the cut end and bottom half inch of the basal portion of each of twenty cuttings. The basal portions of the cuttings were then placed in moist sand, with approximately one-third of the length of the four inch long cutting buried. Thirty-five days after planting, during which time the sand had been kept moist, the cuttings were pulled up and examined. Seventeen of the cuttings had produced roots and three had died. Of the untreated, four had produced roots, fourteen had died and two were alive but had not rooted.

In another experiment the basal ends of the cuttings were soaked overnight in a water solution containing 250 parts per million of disodium 3,6-endoxohexahydro-orthophthalate. These cuttings were planted as outlined above. Of twenty cuttings, fourteen produced roots, five died and one was alive but had produced no roots thirty-five days after planting.

In similar experiments with willow cuttings, all ten of ten cuttings produced roots by both methods. In the checks, seven of the ten rooted.

EXAMPLE 25

A series of comparative experiments was made for the purpose of comparing the phytotoxicity of 3,6 - endoxohexahydro - orthophthalic acid with that of sodium trichloroacetate toward various plant species. In some experiments the acid was used per se; in other experiments it was used in the form of the disodium salt. The chemicals in aqueous solution were sprayed onto various plant species at rates designed to give a known application in terms of pounds of active ingredient per acre. The comparative data are summarized in the following table. The symbols A, B, and C represent:

A. 3,6-endoxohexahydro-orthophthalic acid.
B. Disodium 3,6 - endoxohexahydro - orthophthalate.
C. Sodium trichloroacetate.

duplicate plots. The rates were 2 pounds, 3 pounds, 4 pounds and 5 pounds of active ingredient per acre respectively.

Weeds on the plots sprayed at the rate of two pounds per acre were slightly retarded for about one week. In the plots sprayed at the rate of three pounds per acre the weeds were considerably retarded for about two weeks with a considerable diminution in number and size. On the plots sprayed at the rates of 4 and 5 pounds per acre very few weeds developed, and these few were materially retarded. No injury to the corn was evident in the plots sprayed at the rate of 4 pounds per acre and below, and only slight stunting was evident in the plots sprayed at the rate of 5 pounds per acre.

TABLE 6

| Plant species | Age or size of plants | A | | B | | C | |
|---|---|---|---|---|---|---|---|
| | | Lbs./acre | Plant injury | Lbs./acre | Plant injury | Lbs./acre | Plant injury |
| Oxalis | young | 9 | very severe | | | 30 | killed. |
| Do | mature | | | 18 | severe | 30 | severe. |
| Wheat | 14 days | 9 | very severe | | | 120 | very severe. |
| Do | 1 month | | | 18 | very severe | 120 | killed. |
| Colby milo | 1" high | | | 12 | do | 60 | very severe. |
| Oats | 13 days | 3 to 12 | severe | | | 120 | Do. |
| Do | 28 days | | | 24 | very severe | 120 | Do. |
| Balbo rye | do | | | 18 | killed | 120 | killed. |
| Cabbage | 17 days | 18 | killed | | | 60 | very severe. |
| Do | 28 days | | | 24 | very severe | 60 to 120 | severe. |
| Black locust | seedlings | | | 6 | killed | 60 | killed. |
| Carrots | 25 days | | | 18 | very severe | 60 | very severe. |
| Bluegrass | | | | 18 | killed | 60 | killed. |
| Potatoes | 3" to 4" high | | | 6 to 30 | severe | 180 | very severe. |
| Do | 6" to 7" high | | | 60 | killed | 180 | Do. |
| Bermuda grass | 1 year | 3 to 30 | none | | | 120 | Do. |
| Do | do | | | 60 | slight | | |
| Do | do | | | 240 | severe | | |
| Cocklebur | young | | | 1.5 | killed | 30 | slight to severe. |
| Do | 9" high | | | 6 | do | 120 | severe. |
| Foxtail | ¾" to 2" high | | | 6 to 15 | severe to killed | 15 | very severe. |
| Crabgrass | ¾" to 2" high | | | 15 | do | 15 | severe to killed. |
| Giant ragweed | | | | 3 | very severe | 30 | severe. |
| Mare's tail | | | | 6 | do | 30 | Do. |
| Wild buckwheat | | | | 6 | killed | | |
| Wild lettuce | | | | 3 | severe | 30 | killed. |
| Dock | | | | 18 | killed | 30 | moderate. |
| Henbit | | | | 6 | severe to very severe | 30 | Do. |
| Bindweed | | | | 12 | killed | 12 | Do. |
| Sowthistle | | | | 30 | do | 30 | Do. |
| Hairy chess | | | | 3 | do | 18 | Do. |
| Purslane | | | | 6 | severe | 30 | slight. |
| Do | | | | 12 | killed | | |
| Lamb's Quarter | | | | 18 | slight to severe | 18 | moderate. |
| Milk weed | | | | 12 to 30 | severe | 30 | slight. |
| Wild Mustard | | | | 3 | do | 30 | severe. |
| Do | | | | 12 | killed | | |
| Peppergrass | | | | 12 | do | 30 | moderate. |
| Pigweed | Seedlings | | | 3 | do | 30 | severe. |

EXAMPLE 26

Each of two 22" by 15" by 4" flats containing sandy loam soil were planted with twenty onion sets and a mixture of weed seeds of undetermined species. When the onions were about 6 inches high and the weed seedlings from 1 inch to 3 inches high, the soil and plants of one flat were sprayed with an aqueous solution of disodium 3,6-endoxohexahydro-orthophthalate, the rate of application of active ingredient being 10 pounds per acre. The other flat was not treated but was used as a control. In the treated flat, the tops of the onion plants were burned lightly, and the weed seedlings were destroyed within three days. The onion plants soon recovered, however, and continued to grow as well as those in the control flat, over a three week observation period.

EXAMPLE 27

Eight plots of ground 10' by 20' and separated by control strips were planted with corn in rows 1 foot apart. Duplicate plots were sprayed one day after planting with aqueous solutions of disodium 3,6-endoxohexahydro-orthophthalate at four different rates, one rate for each set of

EXAMPLE 28

Four rows, 18 inches apart, of each of the following crop species were planted lengthwise in a cultivated sandy-loam field, 40 feet by 24 feet: buckwheat, cotton, cucumbers, and oats. The field was divided into four plots, 20 feet by 16 feet, one of which was untreated and three of which were treated one day after planting, with aqueous solutions of disodium 3,6-endoxohexahydro-orthophthalate at 0.062%, 0.125%, and 0.25% concentrations, respectively. A constant volume of 200 gallons per acre was used on each of the treated plots. Thus the plots were successively treated at the following rates of active ingredient: untreated, 1.1 pounds per acre, 2.2 pounds per acre, and 4.4 pounds per acre. Observations over a period of two months showed that all of the treated plots set back the degree of development and reduced the number of each of the various species of weed seedlings without any evident damage to the crop species. Both the number and the size of the weeds varied inversely with the increasing amounts of the herbicidal chemical per acre; however, it was deemed that the 1.1 pound per acre treatment was inadequate, that the 2.2 pound per acre treatment was fair, and that the 4.4 pound per acre treatment was excellent. The number of chickweed and bindweed plants at the 4.4 pound per acre rate was quite negligible as compared with those in the untreated plot; also, those chickweed and bindweed plants which developed in the 4.4 pound per acre plot were quite small as compared with those in the untreated plot. Only one species of weed developed well in the 4.4 pound acre plot: lamb's-quarters.

EXAMPLE 29

Holes ¼ inch in diameter by 1 inch deep were drilled on a downward slant into thornapple and elm trees which were from 4 to 5 inches in diameter. One hole was drilled into each tree approximately 4 feet above ground level. The holes were fitted with a small rubber tube which was sealed in by means of heavy grease and sealing wax. This tube was filled with the treatment solution and inverted into a 4 ounce bottle containing 100 cc. of the same solution. The bottle was suspended above the hole in such a manner that the material would siphon slowly from the bottle into the tree.

At a time after the tree buds had begun to swell in the spring but before they had actually burst open, two thornapple trees each were treated with 1%, 10% and 25% solutions of disodium 3,6 - endoxohexahydro - orthophthalate. These treated trees burst their buds in a manner very similar to neighboring untreated trees. Approximately 3 days after the buds had opened the 10% and 25% solutions had caused the young leaves to be killed and frozen onto the tree. The 1% solution somewhat retarded development of the leaves but did not kill them. The trees treated with 1% solution recovered after approximately a month while the trees treated with higher concentrations still appeared to be dead at the end of three months.

Elm trees similarly treated showed little effect at 1% while the 10% and 25% solutions greatly retarded the development of the small leaves. After 6 weeks the leaves were still extremely small and it was only near the end of the growing season that they had developed as fully as the untreated checks.

Similarly trees were treated approximately 6 weeks after the leaf buds had opened. The effect on the thornapple trees was very similar to that above except that the 1% solution did kill some of the leaves. The elm trees were unaffected at 1%, a portion of the limbs were killed at 10% and apparently the trees were completely killed at 25%. In a clump of thornapple trees two of which seemingly were connected by an underground root system but showed separate above ground trunks, a treated trunk and one other trunk were killed by the 10% solution employed.

One large elm tree approximately 14 inches in diameter and with fully developed leaves was treated on opposite sides of the trunk with two 100 cc. portions of a 25% solution of disodium 3,6-endoxohexahydro-orthophthalate in the above described manner. This solution was absorbed into the tree within 6 hours and wilting of the leaves was very apparent within 24 hours. This wilting commenced at the top of the tree and at the ends of the large branches. Defoliation had commenced at the end of 2 days and after 5 days was at least 95% complete. The majority of leaves that abscised were green. This tree showed no signs of recovery at the end of 3 months.

EXAMPLE 30

A 100 square foot plot of lima bean plants approaching maturity, as indicated by the small bean pods, was sprayed with a 0.5% aqueous solution of disodium 3,6-endoxohexahydro-orthophthalate, applied at 100 gallons per acre (i. e., 4.4 pounds of active ingredient per acre). In nine days, approximately 75% of the leaves had abscised, with no attendant injury to the bean crop and without material detachment of pods from plants. On the other hand, both relatively immature and mature lima bean plants which were sprayed with considerably higher rates based on pounds per acre, of potassium cyanate and calcium cyanamide, respectively, showed very little defoliation.

EXAMPLE 31

A series of tests was conducted with hydrangea plants to determine the value of 3,6-endoxohexahydro-orthophthalic acid in defoliating this plant species. The following experiment is typical. 30 cc. of a $\frac{1}{16}$% aqueous solution of active ingredient was sprayed onto each of four hydrangea plants, averaging 2 feet in height. In two days all of the leaves had abscised with no evident attendant damage to the buds. The plants were kept in a warm greenhouse for a month during which time the buds gave rise to new leaves, further giving evidence that the plants were uninjured.

EXAMPLE 32

0.1 cc. of a 0.06% aqueous solution of 3,6-endoxohexahydro-orthophthalic acid was pipetted onto each primary leaf of 16 individual young bean plants with undeveloped trifoliate shoots. Each plant thus received a total of 0.125 mg. of active ingredient. In five days, four plants had abscised both treated primary leaves and ten plants had abscised a single primary leaf. That trifoliate shoot development was markedly inhibited was indicated by the following: the weight of the trifoliate shoots of the sixteen untreated plants was 26.6 g.; the weight of the trifoliate shoots of the sixteen plants treated with 0.125 mg. of active ingredient per plant was 9.0 g.

EXAMPLE 33

In this experiment, disodium 3,6-endoxohexahydro-orthophthalate and calcium cyanamid were compared as defoliants for apple trees.

The twigs to be treated were shaken vigorously, and a defoliant was applied to the 20 leaves nearest the tip of each twig. In the case of calcium cyanamid, four twigs were wetted with water and the defoliant was dusted onto the leaves until they were covered. In the case of disodium 3,6-endoxohexahydro-orthophthalate, two twigs were sprayed with a 1% aqueous solution of this compound. The same procedure was used to spray other twigs with 2%, 4%, 6%, and 10% aqueous solutions, respectively, of the same compound.

The number of leaves abscised was determined on the fourth and tenth day after treatment. Observations weer also made on control twigs to determine whether there had been any natural defoliation.

The following table summarizes the results of the experiment.

| Defoliant | Twig No. | Extent of defoliation after treatment | |
|---|---|---|---|
| | | After 4 days | After 10 days |
| | | Per cent | Per cent |
| A, 1 per cent | 1 | 25 | 55 |
| A, 1 per cent | 2 | 35 | 60 |
| A, 2 per cent | 3 | 25 | 40 |
| A, 2 per cent | 4 | 60 | 100 |
| A, 4 per cent | 5 | 40 | 90 |
| A, 4 per cent | 6 | 45 | 100 |
| A, 6 per cent | 7 | 60 | 70 |
| A, 6 per cent | 8 | 60 | 100 |
| A, 10 per cent | 9 | 70 | 95 |
| A, 10 per cent | 10 | 75 | 100 |
| B | 11 | 0 | 5 |
| B | 12 | 0 | 5 |
| B | 13 | 0 | 15 |
| B | 14 | 0 | 0 |
| Control | 15 | 0 | 0 |
| Do | 16 | 0 | 0 |

A—Disodium 3,6-endoxohexahydrophthalate.
B—Calcium cyanamid.

EXAMPLE 34

Transplanting of holly plants usually results in considerable loss unless the leaves are removed before moving. Manual plucking of leaves is a very tedious and expensive process. It is possible by practice of the invention to defoliate holly and successfully transplant the stripped bushes without loss.

American holly bushes approximately fifteen inches high were sprayed until all foliage and stems were thoroughly wetted with 0.1%, 0.50%, and 1.0% aqueous solutions of disodium 3,6-endoxohexahydro-orthophthalate. All solutions contained 0.1% of a non-ionic wetting agent. Four plants were treated at each concentration. Average defoliation was 30% for the 0.1% treatment, 58% for the 0.50% treatment and 84% for the 1.0% treatment. All plants survived transplanting and quickly resumed growth.

EXAMPLE 35

This cotton defoliation test was carried out in the Rio Grande Valley.

A spray rig was fitted to a farm tractor. The rig was designed to treat two rows of cotton at one pass. Spray nozzles were so arranged that two 67° flat cone nozzles sprayed each side of the cotton row and one similar nozzle sprayed downward on the top of the row. A 10-gallon feed tank was used and a pump capable of delivering 30 galons per acre of spray solution at a nozzle pressure of 60 pounds per square inch was employed. Fenders on the front and rear wheels and also fenders guarding the spray nozzles prevented injury to the cotton as the tractor moved down the rows.

When this equipment was employed, it was found that 30 gallons of aqueous spray solution per acre gave good coverage of the cotton leaves. All applications were made at this rate; and dosage was regulated by the concentration of active ingredient in the aqueous solutions applied.

A field of cottom which had been irrigated only during its very early growth was selected. This cotton had been picked once and had already yielded approximately ¾ of a bale of cotton to the acre. It was approximately knee-high, and due to the climate the leaves were tough and rather leathery. Dosages of 2.2, 4.4, and 6.6 pounds per acre of disodium 3,6-endoxohexahydro-orthophthalate were applied. One ounce of a polyethylene glycol type wetting agent was added to each 15 gallons of spray solution in order to give good wetting and coverage of the cotton leaves. In each plot four 138 yard rows were treated. Treatment was applied at mid-day of a very hot, dry, sunshiny day during which the temperature reached 104° F. For the next five days negligible dew occurred in the morning, there was no rainfall, and the bright sunny days continued. Very little effect of the spray was noted for the first two days, other than slight burning of the leaves. Commencing on the third day leaf-drop became noticeable. For the dosage of 2.2 pounds per acre, defoliation was approximately 50% at the end of seven days; for the dosage of 4.4 pounds per acre, defoliation was approximately 80%; and for the dosage of 6.6 pounds per acre, defoliation was approximately 70%. Only at the highest rate of application did any "freezing" of the leaves occur. "Freezing" of the leaves is apparently caused by such a quick kill that the leaf does not have time to grow an abscission layer.

EXAMPLE 36

For this application an approximately 8-acre cotton field in Texas was chosen. The cotton had been irrigated normally. A low stream ran diagonally across the field and due to early rain the cotton in this area had been washed out and replanted. The major portion of the field consisted of cotton approximately breast-high which had already been picked once. The replanted area contained young, succulent green cotton which had only about one open boll per ten plants. The weather was the same as in Example 35.

Airplane application was made at only one rate, namely, 4.4 pounds of active ingredient per acre. The form of the acid tested was disodium 3,6-endoxohexahydro-orthophthalate. Application was made by spraying at the rate of 12.5 gallons per acre, and each 12.5 gallons contained 1 ounce of wetting agent.

No actual leaf counts were made in this experiment but it was noted that the old as well as the young cotton defoliated equally well. Considerable leaf drop occurred from the 3rd to the 5th day and was virtually completed by the 8th day. Very slight burning was noted on the first day and while many of the leaves that abscised showed some necrotic spots, most of the leaves abscised while still green. These leaves fell to the ground without shattering by wind.

EXAMPLE 37

Young bean plants were treated individually with cupric 3,6 - endoxohexahydro - orthophthalate by pipetting 0.1 cc. of a mixture of said compound with water onto each of the two primary leaves of each plant. Some plants were treated with a solution of 0.1% concentration, others with an aqueous mixture of 0.5% concentration, and others with an aqueous mixture of 1% concentration. In each of the last two instances a part of the active ingredient was present in finely divided solid form. In all instances, burning of the leaves was evident when observations were made 19 hours after the solutions were applied to the leaves.

Parallel experiments were made with zinc 3,6-endoxohexahydro-orthophthalate, with similar results.

EXAMPLE 38

Aqueous mixtures containing 0.1%, 0.5%, and

1%, respectively, of cupric 3,6-endoxohexahydro-orthophthalate were prepared the same as in Example 37. 0.05 cc. aliquots of each of these mixtures were injected into the hypocotyls of young bean plants. In all instances, drastic burning of the leaves was evident when observations were made 19 hours after injection of the solutions.

Parallel experiments were made with zinc 3,6-endoxohexahydro-orthophthalate, with similar results.

EXAMPLE 39

Two 3-acre plots of cotton were treated with bis(triethylammonium) 3,6 - endoxohexahydro-orthophthalate by the airplane application of 10 gallons of total spray solution per acre. A boom type of spray rig with jets spaced at 6 inch intervals was used on the plane, which flew at the level of the cotton plants.

The first plot was treated at the rate of 1.5 pounds of active ingredient and 1 pint of non-ionic wetting agent per acre. The second plot was treated at the rate of 0.75 pound of active ingredient and 1 pint of non-ionic wetting agent per acre. Irrigation water had been cut off from the field selected for approximately two months and the ground was extremely dry. Maximum day temperatures of 90-100° F. and minimum humidity as low as 10% existed throughout the test. Considerable leaf abscission had commenced at the end of the third day in the plot treated at the higher rate. At the end of eight days, defoliation was approximately 80% complete in the plot treated at the higher rate and was approximately 50% complete in the plot treated at the lower rate. Natural defoliation due to the extremely dry condition of the plants had resulted in approximately 20% leaf abscission during this period in a control plot.

From the foregoing it can be seen that the acid used in the practice of this invention, whether used per se or in some other form, is highly effective in regulating the growth characteristics of viable or living plants, and particularly of plants having vascular systems. For example, the acid may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, or may be employed to stimulate root growth on cuttings, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

This application is a continuation-in-part of our copending application Serial No. 81,026, filed March 11, 1949.

We claim:
1. A method for regulating the growth characteristics of a plant, comprising treating said plant with 3,6-endoxohexahydro-orthophthalic acid.
2. A method for inducing plant response in a living plant, comprising treating said plant with exo-cis-3,6-endoxohexahydro-orthophthalic acid.
3. A method for hastening defoliation of a living plant which defoliates naturally, which comprises treating said plant with an effective amount of exo - cis-3,6-endoxohexahydro - orthophthalic acid in a manner to cause said acid to penetrate the epidermal layer of said plant, said amount being insufficient to kill said plant.
4. The process of claim 3 in which the acid is brought into contact with the surface of said plant in a manner to cause said acid to be absorbed by the vascular system of said plant through said surface.
5. The process of claim 4 in which the acid is sprayed in aqueous solution onto said plant.
6. The process of claim 5 in which said aqueous solution contains a wetting agent.
7. The process of claim 4 in which the acid is applied in the form of a dust diluted with a solid carrier.
8. A method for killing a viable plant comprising applying to said plant an amount effective for killing said plant of exo-cis-3,6-endoxohexahydro-orthophthalic acid.
9. The method of claim 8 in which the acid is applied in aqueous solution to said plant.
10. The process of claim 9 in which said aqueous solution contains a wetting agent.
11. A method for inducing a response in a living plant having a vascular system, comprising bringing into association with said vascular system of said plant an effective amount of anion of exo-cis-3,6-endoxohexahydro-orthophthalic acid.
12. A composition prepared for use as a plant response agent comprising 3,6-endoxohexahydro-orthophthalic acid and a wetting agent.
13. A composition prepared for use as a plant response agent comprising exo-cis-3,6-endoxohexahydro-orthophthalic acid, a wetting agent, and a carrier.
14. The composition of claim 13 in which the carrier is a liquid.
15. The composition of claim 13 in which the carrier is a finely divided solid.
16. A composition prepared for use as a plant response agent comprising exo-cis-3,6-endoxohexahydro-orthophthalic acid and a wetting agent.
17. A composition prepared for use as a plant response agent comprising exo-cis-3,6-endoxohexahydro-orthophthalic acid, a wetting agent, and an aqueous carrier.
18. A method for inducing a response in a living plant which comprises applying to the surface of said plant in amount sufficient to produce said response a compound which when in the presence of water yields anions of exo-cis-3,6-endoxohexahydro-orthophthalic acid.
19. A composition prepared for use as a plant response agent which comprises a wetting agent, and a compound which when in the presence of water yields anions of exo-cis-3,6-endoxohexahydro-orthophthalic acid.

NATHANIEL TISCHLER.
ERNEST P. BELL.

REFERENCES CITED

The following references are of record in the file of this patent:

UNITED STATES PATENTS

| Number | Name | Date |
|---|---|---|
| 2,471,790 | Sowa et al. | May 31, 1949 |